(12) United States Patent
Koike

(10) Patent No.: US 8,203,663 B2
(45) Date of Patent: Jun. 19, 2012

(54) LIQUID CRYSTAL DEVICE AND PROJECTOR HAVING PARTICULAR CONCAVE REFLECTIVE LAYER

(75) Inventor: Satofumi Koike, Isehara (JP)

(73) Assignee: Seiko Epson Corporation, Tokyo (JP)

( * ) Notice: Subject to any disclaimer, the term of this patent is extended or adjusted under 35 U.S.C. 154(b) by 498 days.

(21) Appl. No.: 12/538,918

(22) Filed: Aug. 11, 2009

(65) Prior Publication Data

US 2010/0053482 A1 Mar. 4, 2010

(30) Foreign Application Priority Data

Aug. 29, 2008 (JP) ................................ 2008-221047

(51) Int. Cl.
*G02F 1/1333* (2006.01)
*G02F 1/1343* (2006.01)
*G02F 1/1335* (2006.01)
*G02F 1/136* (2006.01)

(52) U.S. Cl. ............... 349/54; 349/55; 349/113; 349/44

(58) Field of Classification Search ..................... 349/54, 349/55, 113, 44

See application file for complete search history.

(56) References Cited

U.S. PATENT DOCUMENTS 6,157,429 A * 12/2000 Miyawaki et al. ............ 349/138
6,166,792 A * 12/2000 Miyawaki et al. ............ 349/113

FOREIGN PATENT DOCUMENTS

| JP | 7-294896 A | 11/1995 |
| JP | 10-177169 A | 6/1998 |
| JP | 2007-133423 A | 5/2007 |

* cited by examiner

*Primary Examiner* — Mike Qi
(74) *Attorney, Agent, or Firm* — Lowe, Hauptman, Ham & Berner, LLP

(57) ABSTRACT

A liquid crystal device includes a first substrate, an optically transparent second substrate, a liquid crystal layer provided between the first and second substrates, a plurality of light reflecting pixel electrodes provided between the first substrate and the liquid crystal layer, pixels including the pixel electrodes, a translucent electrode provided between the second substrate and the liquid crystal layer, and a reflective layer. The reflective layer is provided close to the first substrate rather than the pixel electrodes so as to overlap, in plan view, at least a part of a gap between the first pixel electrode of the pixel electrodes and the second pixel electrode adjacent to the first pixel electrode, and the cross-section of the reflective layer in a direction where the first and second pixel electrodes are adjacent to each other has a concave surface that is dented toward a side opposite to the liquid crystal layer.

8 Claims, 6 Drawing Sheets

LIQUID CRYSTAL DEVICE AND PROJECTOR HAVING PARTICULAR CONCAVE REFLECTIVE LAYER

RELATED APPLICATIONS

The present application is based on, and claims priority from, Japanese Application Number 2008-221047, filed Aug. 29, 2008, the disclosure of which is hereby incorporated by reference herein in its entirety.

BACKGROUND

1. Technical Field

The present invention relates to a liquid crystal device and a projector.

2. Related Art

A projector using a liquid crystal device has been employed as an apparatus of a small size that displays television images and the like on a large screen. As a typical example of the projector, there has been used a projector, which separates an image corresponding to each of three primary colors of light (RGB (red, green, and blue colors)), forms an image for each color, and then composites the images again to form an image.

A reflective liquid crystal device is known as a liquid crystal device used to achieve the above-mentioned projector. The reflective liquid crystal device has a smaller gap between pixels as compared to a transmissive liquid crystal device, and has the advantage of obtaining a smooth image. Even in this case, it is necessary to electrically separate reflective layers, which are also used as electrodes of the reflective liquid crystal device, from each other, and a gap needs to be formed between the electrodes.

For example, in order to optically fill in the gap, as disclosed in JP-A-7-294896, there has been known a technique that provides a reflective material having diffuseness and reflectivity to the gap. Further, as disclosed in JP-A-10-177169, there has been known a technique that provides a reflective layer overlapping the gap in plan view and reflects light entering from the gap by reflecting incident light. Furthermore, as disclosed in JP-A-2007-133423, there has been known a technique that provides a reflective layer including a color filter to at least a part of a region corresponding to the gap in plan view.

However, the reflection direction of light, which enters the gap, is not controlled in any case of the above-mentioned techniques. For this reason, if the optical axis of incident light is inclined with respect to the normal direction of a liquid crystal layer, the reflected light cannot be used for display, and a gap region becomes dark. This phenomenon becomes conspicuous when the optical axis of incident light is inclined by about 10° or more with respect to the normal direction of the liquid crystal layer. In this case, since the gap region becomes dark, there is a problem that it is not possible to obtain image smoothness. Further, since effective utilization of the light is reduced, there is a problem that the brightness of the liquid crystal device decreases.

SUMMARY

An advantage of some aspects of the invention may be achieved as the following embodiments or application examples. Meanwhile, in the following description, a "focal point" is defined as a position where light converges into the smallest range.

APPLICATION EXAMPLE 1

A liquid crystal device according to this application example includes a first substrate, a second substrate that is optically transparent, a liquid crystal layer that is provided between the first and second substrates, a plurality of pixel electrodes, the plurality of pixel electrodes reflecting light and being provided between the first substrate and the liquid crystal layer, a translucent electrode that is provided between the second substrate and the liquid crystal layer, and a reflective layer. The reflective layer is provided close to the first substrate rather than the plurality of pixel electrodes so as to overlap, in plan view, at least a part of a gap between a first pixel electrode of the plurality of pixel electrodes and a second pixel electrode of the plurality of pixel electrodes adjacent to the first pixel electrode, the cross-section of the reflective layer in a direction along which the first and second pixel electrodes are adjacent to each other having a concave surface that is dented toward a side opposite to the liquid crystal layer.

According to this, it may be possible to reflect light, which passes through the gap between the first pixel electrode and the second pixel electrode adjacent to the first pixel electrode at various angles from the second substrate, to the second substrate by the reflective layer and to use the light for display. In this case, the alignment of the liquid crystal layer, which is positioned at the gap provided near the first electrode, is controlled by the fringe effect that is generated from the first electrode. Further, the liquid crystal device according to the application example of the invention displays a dark state when a voltage is not applied to the liquid crystal layer, and displays a bright state when a voltage is applied to the liquid crystal layer. Accordingly, light, which passes through the gap and is reflected by the reflective layer, is blocked when a voltage is not applied to the liquid crystal layer, and is not blocked when a voltage is applied to the liquid crystal layer. Therefore, the gap also functions, like a pixel, as an available display region. By use of a reflective layer of which the cross-section in a direction where the first and second pixel electrodes are adjacent to each other has a concave surface dented toward the side opposite to the liquid crystal layer, it may be possible to make the optical axis of the reflected light of the light, which obliquely enters the gap, approach the direction of the normal line of the first substrate. Accordingly, the use efficiency of light is improved as compared to when a flat reflective layer is used. Therefore, it may be possible to provide a bright liquid crystal device.

APPLICATION EXAMPLE 2

In the liquid crystal device according to the application example, an electric field that is generated by a fringe effect generated from an edge of the first pixel electrode and an electric field that is generated by a fringe effect generated from an edge of the second pixel electrode may be applied to the liquid crystal layer corresponding to the gap, and the gap may be used for display by the electric fields.

According to the above-mentioned application example, liquid crystal molecules between the first and second pixel electrodes are aligned by a fringe effect. For this reason, the gap can also contribute to display, and it may be possible to provide a brighter liquid crystal device.

APPLICATION EXAMPLE 3

In the liquid crystal device according to the application example, when both a display state of a first pixel including the first pixel electrode and a display state of a second pixel including the second pixel electrode are a bright state, a display state of the gap is also a bright state. Further, when both the display state of the first pixel and the display state of the second pixel are a dark state, the display state of the gap is also a dark state.

According to the above-mentioned application example, it may be possible to observe the display states of the liquid crystal by the first and second pixel electrodes, and to visually confirm that the region positioned at the gap between the first and second pixel electrodes is normally controlled by both pixels.

APPLICATION EXAMPLE 4

In the liquid crystal device according to the application example, a cross-sectional shape of the reflective layer along the direction within the gap may be a parabolic shape.

According to the above-mentioned application example, light, which passes through the gap from the second substrate, is reflected by the reflective layer, converges, and passes through the gap. For this reason, the use efficiency of light, which obliquely enters the gap, is improved as compared to when a flat reflective layer is used. Therefore, it may be possible to provide a brighter liquid crystal device.

APPLICATION EXAMPLE 5

In the liquid crystal device according to the application example, the reflective layer may overlap at least a part of edges of the first pixel electrode in plan view.

According to the above-mentioned application example, the reflective layer overlaps at least a part of regions of the pixel electrodes in plan view. For this reason, regions, which overlap the pixel electrodes in plan view, are formed. Since the use efficiency of separated light is improved, it may be possible to provide a brighter liquid crystal display device.

APPLICATION EXAMPLE 6

In the liquid crystal device according to the application example, light, which passes through the gap from the second substrate, may be reflected by the reflective layer and be caused to converge into the gap.

According to the above-mentioned application example, light, which passes through the gap, is reflected and emitted so as to converge into the gap. For this reason, the light, which enters in an oblique direction, can also contribute to display, and it may be possible to provide a brighter liquid crystal display device.

APPLICATION EXAMPLE 7

In the liquid crystal device according to the application example, the reflective layer may be formed of the same layer as a light shielding layer that shields a part of the first substrate.

According to the above-mentioned application example, it may be possible to simplify the manufacturing processes. Furthermore, if the light shielding layer and the reflective layer are formed of the same layer, it is not necessary to separately provide a reflective layer. Therefore, it may be possible to manufacture a liquid crystal device in a short time.

APPLICATION EXAMPLE 8

A projector according to this application example may use the above-mentioned liquid crystal device.

Accordingly, since a projector is formed using a bright liquid crystal device, it may be possible to provide a projector that has high brightness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to drawings.

First Embodiment

Liquid Crystal Device

Figure 1:
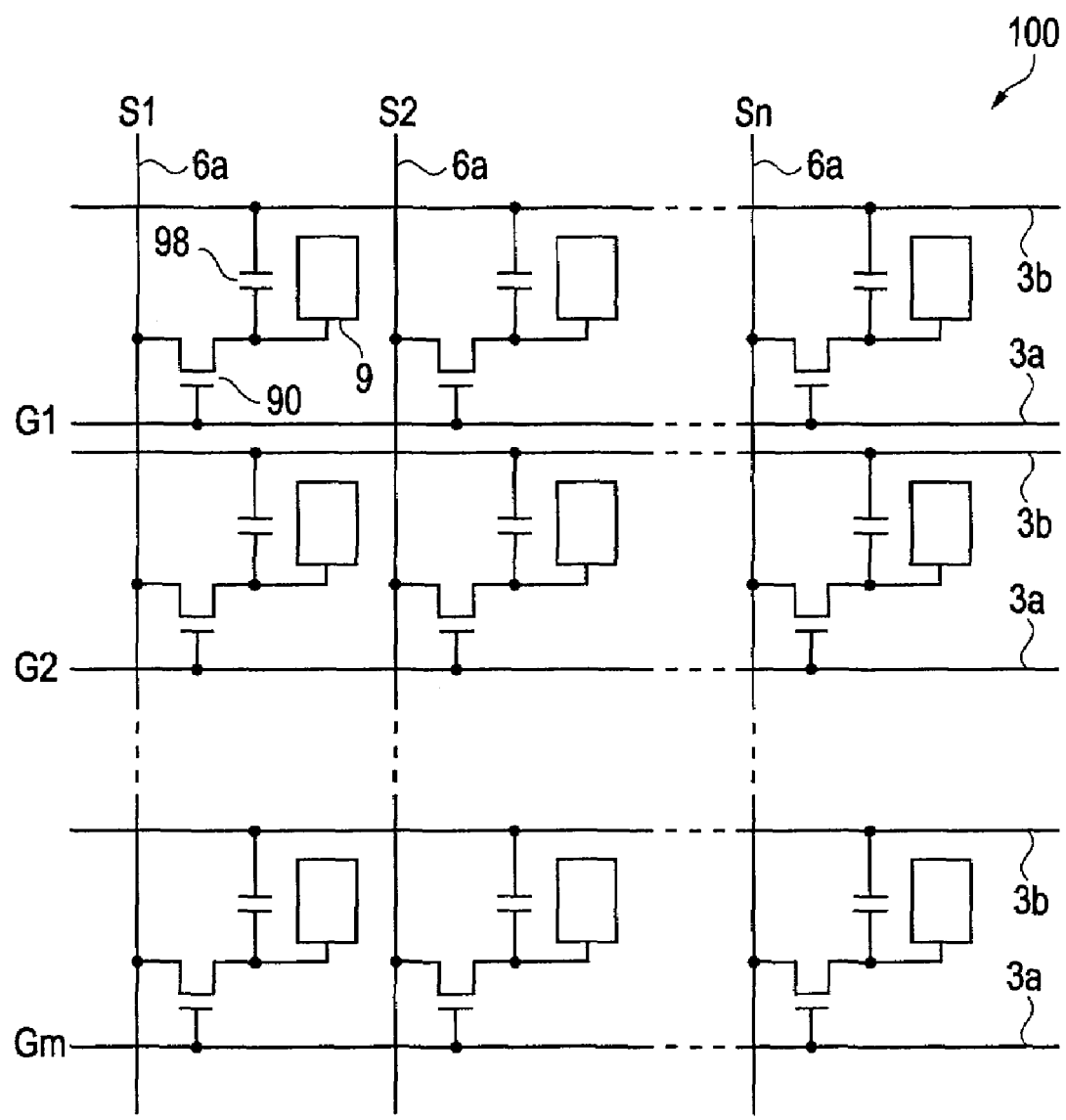
FIG. 1 is an equivalent circuit diagram of a liquid crystal device according to a first embodiment.
Figure 2:
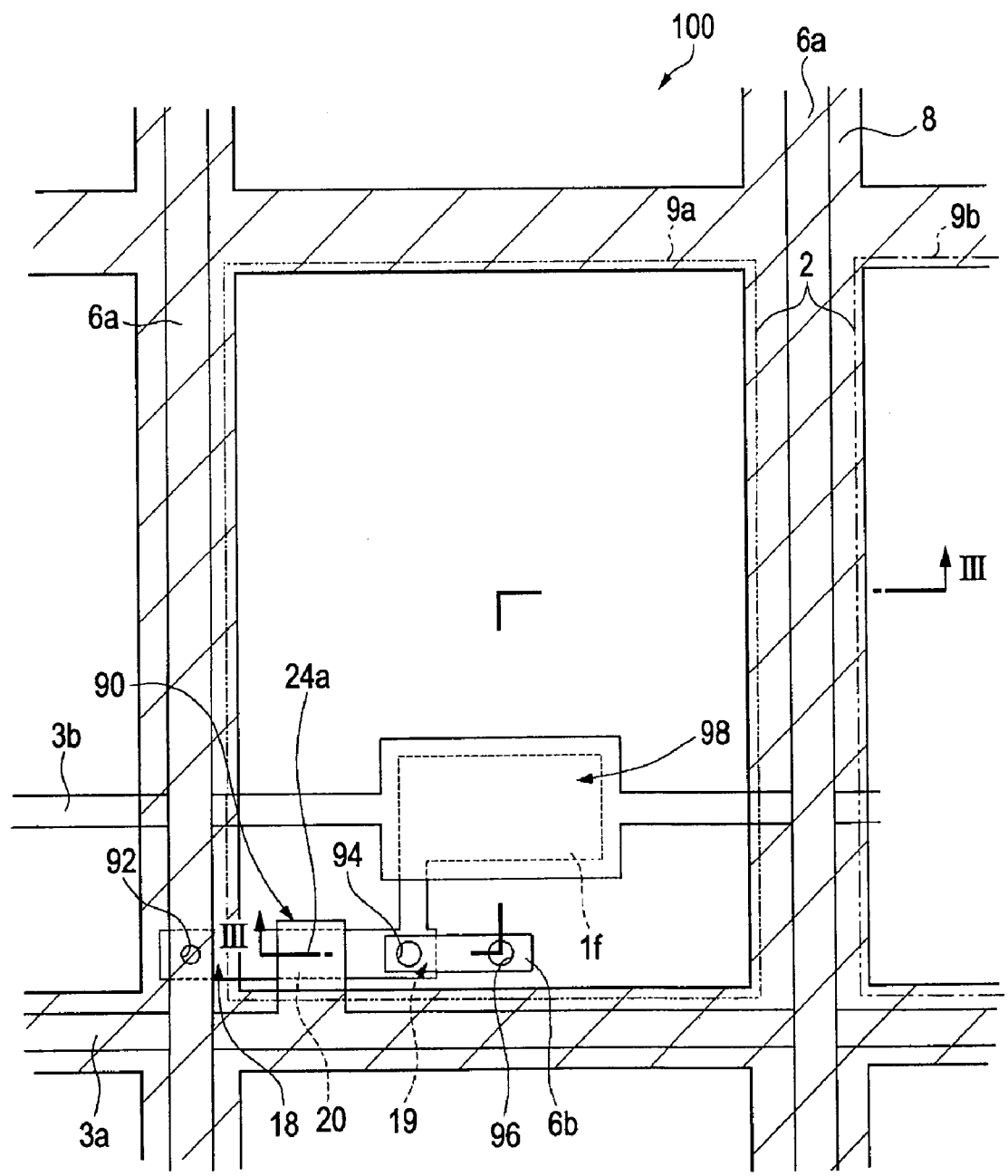
FIG. 2 is a plan view of the liquid crystal device.
Figure 3:
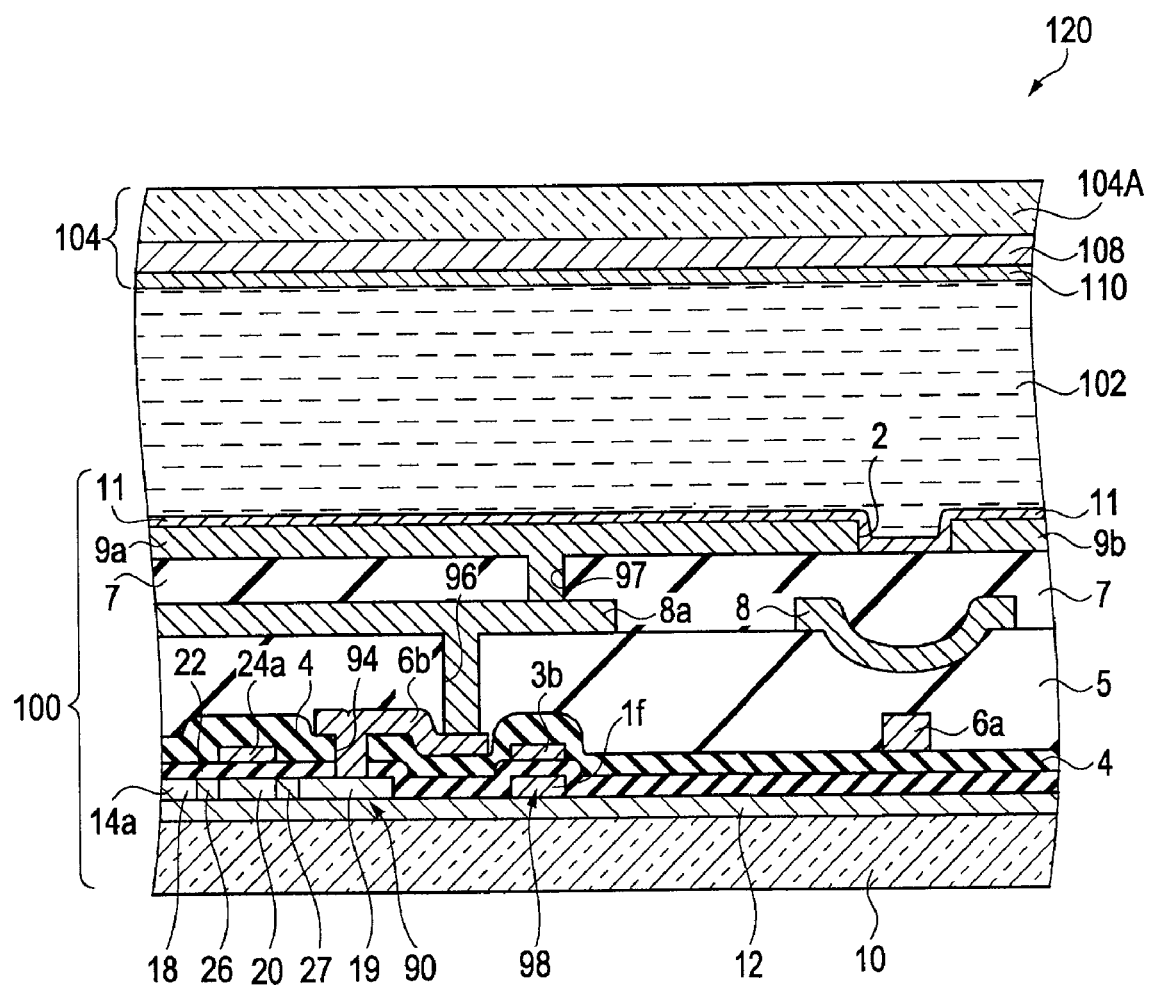
FIG. 3 is a cross-sectional view taken along a line III-III of FIG. 2.

A liquid crystal device according to a first embodiment will be described first. FIG. 1 is an equivalent circuit diagram of a liquid crystal device according to a first embodiment, FIG. 2 is a plan view of the liquid crystal device, and FIG. 3 is a cross-sectional view taken along a line III-III of FIG. 2.

As shown in FIG. 1, a TFT array substrate 100 is provided with a plurality of pixels that is disposed in a matrix and forms an image display region. Further, a pixel electrode 9 and a TFT (thin film transistor) 90 that is a switching element are formed in each of the pixels, and a data line 6a to which image signals are supplied is electrically connected to a drain region 18 (see FIG. 3) of the TFT 90. Image signals S1, S2, . . . , Sn are line-sequentially supplied to the data lines 6a in this order, or are supplied to a plurality of data lines 6a, which are adjacent to one another, for each group.

Further, a scan line 3a is electrically connected to a gate electrode 24a (see FIG. 3) of the TFT 90, and scanning signals G1, G2, . . . , Gm are line-sequentially supplied to the plurality of scan lines 3a in the form of a pulse at a predetermined timing. Furthermore, the pixel electrodes 9 are electrically connected to the drain regions 18 of the TFTs 90. The pixel electrodes write the image signals S1, S2, . . . , Sn, which are supplied from the data lines 6a, at a predetermined timing by turning on the TFTs 90, which are switching elements, only during a predetermined period of time.

The image signals S1, S2, . . . , Sn, which are supplied to a liquid crystal layer 102 (see FIG. 3) through the pixel electrodes 9 and have a predetermined level, are kept (see FIG. 3) during a predetermined period of time. Since the alignment of liquid crystal molecules is changed according to the level of a voltage to be applied, the liquid crystal layer 102 may modulate light and display gradation. In this case, a storage capacitor 98 is added in parallel with a capacitor of the liquid crystal layer 102, which is formed between the pixel electrode 9 and the common electrode 108, in order to prevent the leakage of the kept image signals.

As shown in FIG. 3, a liquid crystal device 120 according to this embodiment includes a TFT array substrate 100 and an opposite substrate 104 that are disposed to face each other with the liquid crystal layer 102 therebetween. The TFT 90 and the pixel electrodes 9a and 9b are formed in the TFT array substrate 100, and the common electrode 108 is formed in the opposite substrate 104.

The planar structure of the TFT array substrate 100 will be described below with reference to FIG. 2. A plurality of rectangular pixel electrodes 9a and 9b is formed in a matrix at the TFT array substrate 100. As shown in FIG. 2, data lines 6a, scan lines 3a, and capacitor lines 3b are provided along the vertical and horizontal borders of each of the pixel electrodes 9a and 9b. In this embodiment, a pixel is formed of a region that includes each of the pixel electrodes 9a and 9b and the data lines 6a, the scan lines 3a, and the like formed to surround each of the pixel electrodes 9a and 9b.

The data line 6a is electrically connected to the drain region 18 of a polycrystalline semiconductor layer 14a (see FIG. 3) of the TFT 90 through a contact hole 92. The pixel electrodes 9a and 9b are electrically connected to the source region 19 of the polycrystalline semiconductor layer 14a through a contact hole 96, a source line 6b, and a contact hole 94. Further, a part of the scan line 3a is wide so as to face a channel region 20 of the polycrystalline semiconductor layer 14a, and a wide portion of the scan line 3a functions as a gate electrode 24a. Furthermore, the polycrystalline semiconductor layer 14a of the TFT 90 extends up to a portion that faces the capacitor line 3b, and the storage capacitor 98, which uses this extension portion if as a lower electrode and the capacitor line 3b as an upper electrode, is formed.

The cross-sectional structure of the liquid crystal device according to this embodiment will be described below with reference to FIG. 3. The TFT array substrate 100 includes a substrate 10 made of glass or silicon, the pixel electrodes 9a and 9b, the TFT 90, and an alignment layer 11, as main components. The pixel electrodes, the TFT, and the alignment layer are formed at the liquid crystal layer 102 of the TFT array substrate. The opposite substrate 104 includes a substrate 104A made of a translucent material such as glass, a light-transmissive common electrode 108, and an alignment layer 110, as main components. The light-transmissive common electrode and the alignment layer are formed on the surface of the substrate 104A facing the liquid crystal layer 102 and made of an indium tin oxide (ITO) or the like.

In detail, a base protective layer 12 formed of a silicon oxide layer or the like is formed on the substrate 10 of the TFT array substrate 100. Further, the pixel electrodes 9a and 9b made of aluminum or the like are formed on the side of the substrate 10 facing the liquid crystal layer 102, and the TFT 90 is formed so as to correspond to each of the pixel electrodes 9a and 9b.

A polycrystalline semiconductor layer 14a made of polycrystalline silicon is formed in a predetermined pattern on the base protective layer 12, a gate insulating layer 22 formed of a silicon oxide layer or the like is formed on the polycrystalline semiconductor layer 14a, and a gate electrode 24a is formed on the gate insulating layer 22. Further, a region of the polycrystalline semiconductor layer 14a, which faces the gate electrode 24a through the gate insulating layer 22, forms a channel region-20 where a channel is formed by an electric field generated from the gate electrode 24a. Furthermore, the drain region 18 is formed on one side (left side in the drawing) of the channel region 20 of the polycrystalline semiconductor layer 14a, and the source region 19 is formed on the other side (right side in the drawing) of the channel region. The TFT 90 is formed of the gate electrode 24a, the gate insulating layer 22, the data line 6a, the source line 6b, and the drain, channel, and source regions 18, 20, and 19 of the polycrystalline semiconductor layer 14a, and the like.

In this embodiment, the TFT 90 has an LDD structure. The drain and source regions 18 and 19 of which the concentration of impurities is relatively high, a low concentration region 26 facing the drain region, and a low concentration region 27 facing the source region are formed at the TFT.

Further, a first interlayer insulating layer 4 formed of a silicon oxide layer or the like is formed on the substrate 10, and a data line 6a and a source line 6b are formed on the first interlayer insulating layer 4. The data line 6a is electrically connected to the drain region 18 of the polycrystalline semiconductor layer 14a through a contact hole (not shown), and the source line 6b is electrically connected to the source region 19 of the polycrystalline semiconductor layer 14a through the contact hole 94 that is formed at the first interlayer insulating layer 4.

Further, a second interlayer insulating layer 5 made of silicon nitride or the like is formed on the first interlayer insulating layer 4 on which the data line 6a and the source line 6b are formed, and a light shielding layer 8a made of metal such as aluminum or the like is formed on the second interlayer insulating layer 5. The light shielding layer 8a has a function of shielding a region, of which operation is made unstable by stray light, such as the TFT 90. The light shielding layer 8a is electrically connected to the source line 6b through the contact hole 96 that is formed at the second interlayer insulating layer 5. A third interlayer insulating layer 7 made of silicon oxynitride or the like is provided on the second interlayer insulating layer 5. Further, the pixel electrode 9a is electrically connected to the light shielding layer 8a through a contact hole 97 that is formed at the third interlayer insulating layer 7. Furthermore, an alignment layer 11, which controls the arrangement of liquid crystal molecules in the liquid crystal layer 102, is formed on the outermost surface of the TFT array substrate 100 facing the liquid crystal layer 102.

Meanwhile, the common electrode 108 made of an ITO or the like is formed on substantially the entire surface of the substrate 104A of the opposite substrate 104 that faces the liquid crystal layer 102. Further, the alignment layer 110 is formed between the common electrode 108 and the liquid crystal layer 102.

Furthermore, a concave reflective layer 8 is provided on the side of a gap 2, which is formed between the adjacent pixel electrodes 9a and 9b formed on the TFT array substrate 100, close to the substrate 10. The reflective layer 8 overlaps the gap 2 in plan view, and reflects the light, which enters from the opposite substrate 104, to the opposite substrate 104. The shape of the reflective layer 8 is preferably formed so that the reflective layer is wider than the gap 2 and overlaps the edges of the pixel electrodes 9a and 9b. The cross-sectional shape of the reflective layer in a direction along which the pixel electrodes 9a and 9b are adjacent to each other is preferably, for example, a parabolic shape, and is preferably a shape where a vertex of a parabola passes through the middle of the gap 2. Further, it is preferable that light reflected by the reflective layer 8 converge into the gap 2. In this case, light entering through the gap 2 is reflected and caused to converge by the reflective layer 8, and passes through the gap 2 again.

Even at positions that are distant from the ends of the pixel electrodes 9a and 9b, an electric field is applied to the liquid crystal layer 102 by fringe effects generated from the pixel electrodes 9a and 9b. Further, the width of the gap 2 is sufficiently narrow so that a fringe effect is applied to the inside of the gap 2. In addition, when a voltage is not applied to the liquid crystal layer 102, the liquid crystal device according to the embodiment of the invention displays a dark state. When a voltage is applied to the liquid crystal layer 102, the liquid crystal device displays a bright state. Accordingly, when a voltage is not applied to the pixel electrodes 9a and 9b, a voltage is also not applied to the liquid crystal layer 102 corresponding to the gap 2 near the pixel electrodes. Therefore, light, which passes through the gap and is reflected by the reflective layer 8, is blocked. For this reason, it may be considered that a light shielding layer is provided at the gap 2. Meanwhile, when a voltage is applied to the pixel electrodes 9a and 9b, a voltage is also applied to the liquid crystal layer corresponding to the gap 2 by the fringe effect of the pixel electrodes. Accordingly, reflected light is not blocked. Therefore, the gap 2 also functions, like the pixel, as an available display region. For example, if the display state of a first pixel including the pixel electrode 9a and the display state of a second pixel including the pixel electrode 9b are dark states, the display state of the gap 2 is also a dark state. Further, if the display states of the first and second pixels are bright states, the display state of the gap 2 is also a bright state.

If a dark state is displayed as described above, it may be possible to obtain the same dark state as when the light shielding layer is provided at the gap even though the reflective layer 8 is provided at the gap 2. Meanwhile, if a bright state is displayed, the gap 2 also functions as an available display region like the region including the pixel electrodes 9a and 9b. Therefore, the use efficiency of light is improved, so that the liquid crystal device becomes bright. As a result, display of which a contrast ratio is very high is obtained.

It is preferable that the width of the gap 2 be substantially equal to or smaller than twice the distance where a fringe effect is applied. If the width of the gap exceeds twice the distance, neither the fringe effect generated from the pixel electrode 9a nor the fringe effect generated from the pixel electrode 9b apply, so that a region, which is not used for display, is generated. For this reason, it is not preferable that the width of the gap exceeds twice the distance. Further, the minimum width of the gap 2 is defined by the limitation on machining, and a lower limit of the width of the gap is about 0.3 μm in this situation. The lower limit of the width of the gap is a value that varies with the advances in machining technique. When the width of the gap is about 0.5 μm as described below, it may be possible to stably form the gap in the process.

In a region where the fringe effects generated from the pixel electrodes 9a and 9b overlap each other, halftone display is performed by both fringe effects. If the region contributes to display, it may be possible to obtain a smooth image.

If the width of the gap 2 is substantially equal to twice the distance where a fringe effect is applied, there is a region that is affected by only one effect of the fringe effects generated from the pixel electrodes 9a and 9b. Even in this case, if the region affected by the fringe effect contributes to display, it may be possible to obtain a smooth image.

A typical value of the dimension of each of the pixel electrodes 9a and 9b is about 5 μm, and a typical value of the width of the gap 2 is about 0.5 μm. It may be possible to improve the brightness by about 10% by reflecting the light, which passes through the gap 2 from the opposite substrate 104, to the opposite substrate 104. Further, even at positions that are distant from the ends of the pixel electrodes 9a and 9b, an electric field is applied to the liquid crystal layer by fringe effects generated from the pixel electrodes 9a and 9b as described above. Accordingly, the gap 2 is treated as a portion that is effectively involved in display. Therefore, it may be possible to obtain a liquid crystal device 120 that can display a smooth image.

Further, in this case, the light shielding layer 8a and the reflective layer 8 may be formed of the same layer. For example, it may be possible to form the light shielding layer 8a and the reflective layer 8 with the same layer by using an aluminum layer having a thickness of about 150 nm. Accordingly, it may be possible to simplify the manufacturing processes. Furthermore, if the light shielding layer 8a and the reflective layer 8 are integrally formed when the electrical potential of the reflective layer 8 is fixed to the electrical potential of the pixel electrodes 9a and 9b, it may be possible to further simplify the manufacturing processes.

Modification of First Embodiment

The liquid crystal device 120 has been described above, but the following modification may also be preferably used. The TFT 90 for switching the pixel has an LDD structure in the above-mentioned embodiment. However, the modification does not need to have an LDD structure, and one or both of the low concentration region 26 facing a drain region and the low concentration region 27 facing a source region may be omitted. In this case, it may be possible to simplify the processes for manufacturing the TFT 90.

Further, it may be possible to reduce the area of the TFT 90 by omitting at least one of the low concentration region 26 facing the drain region and the low concentration region 27 facing the source region. Furthermore, it may be possible to omit an LDD region of any one of a PMOS transistor and an NMOS transistor that are used as the TFT 90. In particular, since the PMOS transistor is hardly affected by a hot carrier, it is also preferable that the LDD structure of the only PMOS transistor be omitted. In this case, it may be possible to increase the mutual conductance of the PMOS transistor, and to reduce the difference in performance between the NMOS and PMOS transistors (a difference between values of mutual conductance of the NMOS and PMOS transistors).

Further, a transistor having a gate overlap structure may be preferably used as the TFT 90, and it may be possible to provide a liquid crystal device 120 of which the characteristic degradation caused by a hot carrier is less. Meanwhile, even in this case, a gate overlap structure may be employed in only one of the PMOS and NMOS transistors.

The base protective layer 12 is not an essential component and may be omitted. Further, a crystalline semiconductor layer or an amorphous semiconductor layer may be used instead of the polycrystalline semiconductor layer 14a. Furthermore, the light shielding layer 8a is not an essential component and may be omitted. In particular, in the above-mentioned embodiment, light, which enters through the gap 2 between the pixel electrodes 9a and 9b, returns to the outside of the liquid crystal device 120 by the reflective layer 8. Accordingly, since the penetration of stray light into the liquid crystal device 120 is suppressed, the light shielding layer 8a may be omitted. As a result, it may be possible to design the layout of a TFT array substrate 100 with a high degree of freedom.

Meanwhile, if the light shielding layer 8a is omitted, it may be possible to drive the pixel electrodes by directly connecting the source line 6b to the pixel electrodes 9a and 9b. Further, even if the light shielding layer 8a is formed, the source line 6b may be directly connected to the pixel electrodes 9a and 9b at least a part of the region. Even in this case, it may be possible to improve the degree of freedom in designing a layout.

Further, the width of the reflective layer 8 is not necessarily larger than the width of the gap 2, and may be in a range that is smaller than the width of the gap 2. Even in this case, it may be possible to increase the brightness of the liquid crystal device 120 by providing the reflective layer 8. Furthermore, the electrical potential of the reflective layer 8 is not necessarily fixed and may vary. In this case, wiring for fixing the electrical potential of the reflective layer 8 may be omitted. Further, the TFT 90 may be electrically connected to the pixel electrodes 9a and 9b by the reflective layer 8. Furthermore, the reflective layer 8 may be omitted at a part of the region, so that it may be possible to improve the degree of freedom in designing a layout.

In addition, the cross-sectional shape of the reflective layer 8 is not limited to a parabolic shape. The reflective layer may have a structure that reflects the light, which passes through the gap 2 from the opposite substrate 104, causes the light to converge into the gap 2, and emits a part of the light to the opposite substrate 104. Alternatively, the reflective layer may also have a shape where two plane mirrors are disposed in a V shape, the shape of a multistage broken line, the shape of a part of an ellipse, and the like.

Further, it is preferable that the light reflected by the reflective layer 8 converge into the gap 2, but this is not an essential requirement. The reflective layer may also have a concave structure so that at least a part of the light, which enters in the oblique direction of the liquid crystal layer 102 and is reflected by the reflective layer 8, passes through the gap 2 again.

Further, it is preferable that the reflective layer 8 and the light shielding layer 8a be formed of the same layer. In this case, it may be possible to simplify the manufacturing processes. Furthermore, the reflective layer 8 and the light shielding layer 8a may be formed of different layers. In this case, it may be possible to improve the degree of freedom in designing a layout.

Second Embodiment

Method of Manufacturing Liquid Crystal Device

An example of a method of manufacturing the liquid crystal device 120, which has been described with reference to FIGS. 1 to 3, will be described below. Herein, since a manufacturing the TFT 90 has been commonly known, the detailed description thereof will be omitted and the characteristics of the embodiment will be described in detail. Meanwhile, means for forming this structure is not limited to the means described herein, and is intended to mainly describe a requirement for formation of the above-mentioned structure. FIGS. 4A to 4C and FIGS. 5A and 5B are cross-sectional views illustrating processes for manufacturing the liquid crystal device 120 according to this embodiment.

Figure 4A:
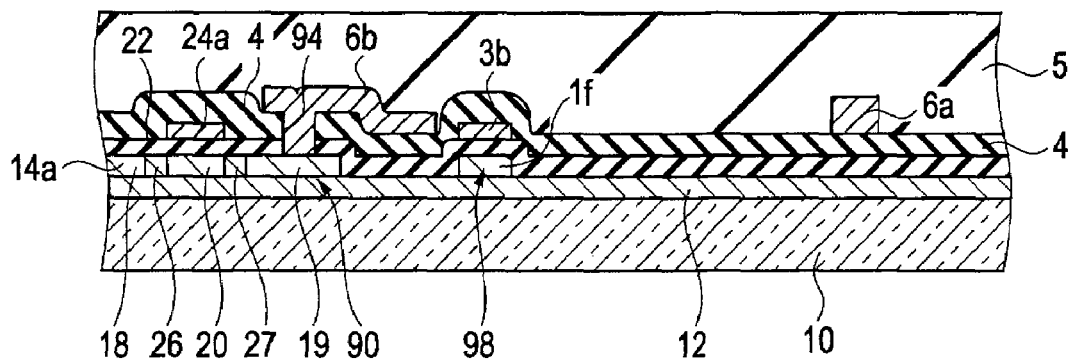
FIGS. 4A to 4C are cross-sectional views illustrating processes for manufacturing the liquid crystal device.

First, in Process 1, the second interlayer insulating layer 5 and the like of the TFT array substrate 100 (to be described below), which includes the TFT 90 and the like, are formed by a commonly known manufacturing method. FIG. 4A shows a structure at the time when this process is completed.

Figure 4B:
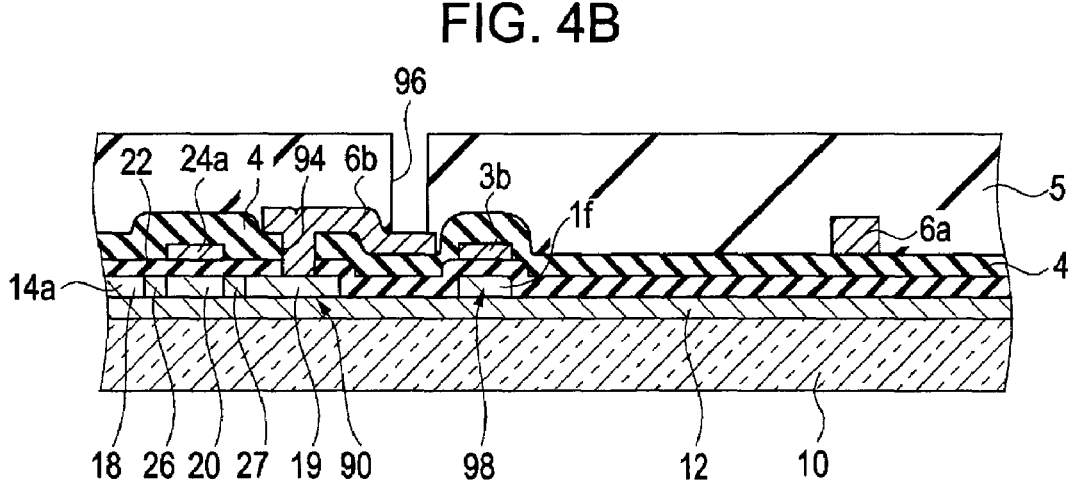

After that, in Process 2, the contact hole 96 is formed by commonly known photolithography and etching processes. FIG. 4B shows a structure at the time when this process is completed.

Figure 4C:
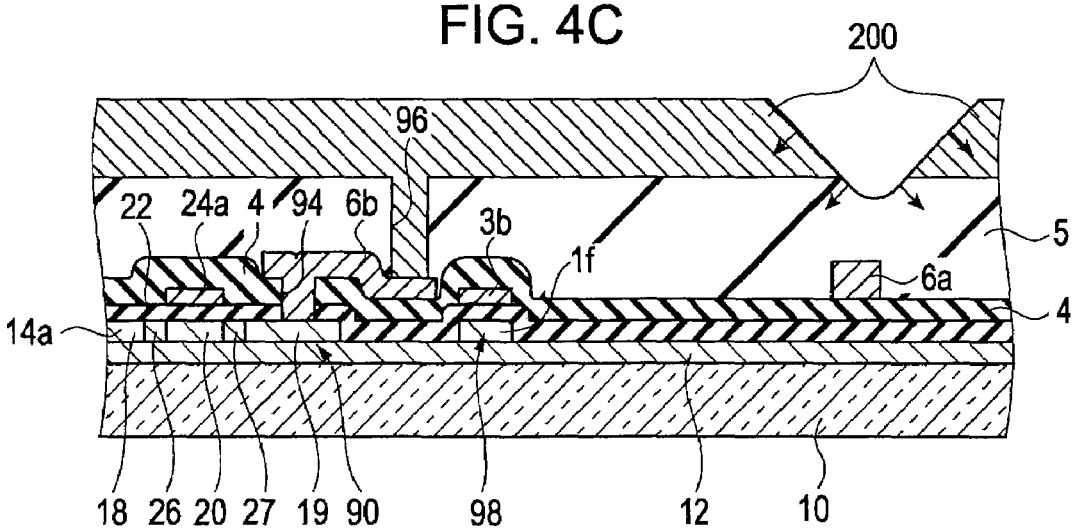

Subsequently, in Process 3, etching is performed so that the second interlayer insulating layer 5 positioned at a location where the reflective layer 8 is positioned has a concave shape. This etching method may be achieved by forming an opened tapered resist pattern 200 at the second interlayer insulating layer 5 that is positioned at a location where the reflective layer 8 is positioned, and simultaneously performing the dry etching of the resist pattern 200 and the dry etching of the second interlayer insulating layer 5 in order to form a concave pattern. FIG. 4C shows a structure while this process is performed. In this case, the resist pattern may be formed in a normal shape, and a method of forming a concave pattern through the combination of wet etching and dry etching may be used.

Figure 5A:
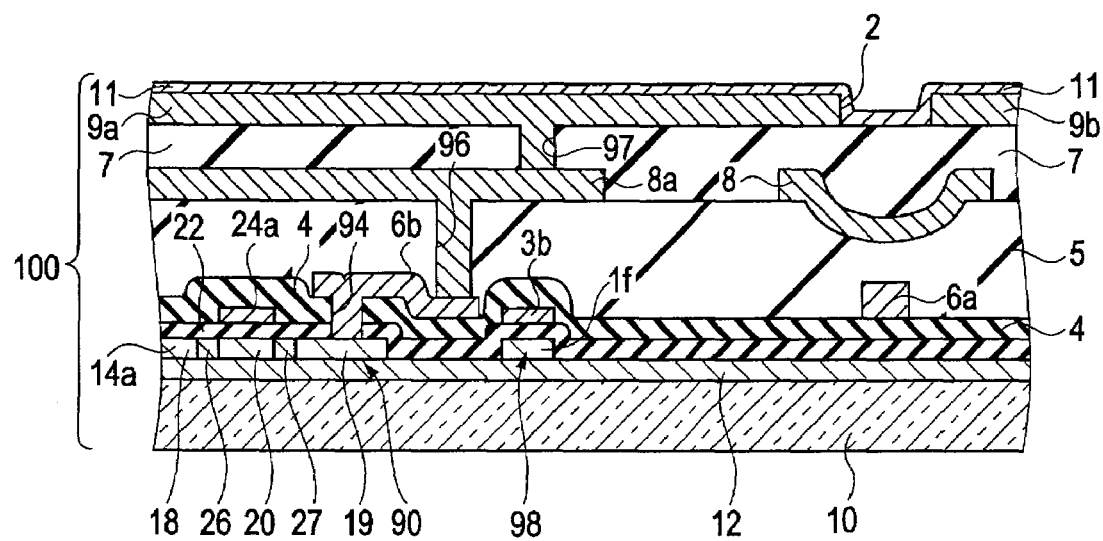
FIGS. 5A and 5B are cross-sectional views illustrating processes for manufacturing the liquid crystal device.

After that, a layer made of aluminum or the like is deposited by a sputtering method or the like, and the reflective layer 8 and the light shielding layer 8a are formed by commonly known photolithography and etching processes. In this case, the reflective layer 8 and the light shielding layer 8a may be formed of different layers. Subsequently, the third interlayer insulating layer 7 made of silicon oxynitride or the like is formed, and the contact hole 97 is formed by commonly known photolithography and etching processes. Further, a layer made of aluminum or the like is deposited by a sputtering method or the like, and the pixel electrodes 9a and 9b are formed by commonly known photolithography and etching processes. Subsequently, the alignment layer 11 is formed. A rubbing method, an oblique deposition method, an oblique exposure method, and the like may be used as a method of manufacturing the alignment layer 11. FIG. 5A shows a structure at the time when this process has been completed using the above-mentioned processes. The TFT array substrate 100 is formed by the above-mentioned processes.

Figure 5B:
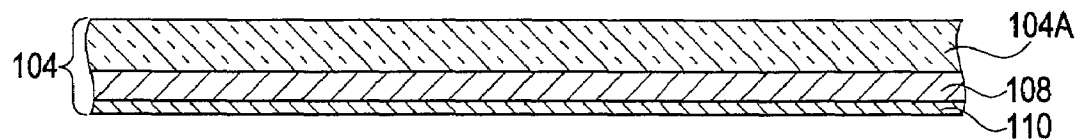

Then, the light-transmissive common electrode 108, which has a thickness of about 120 nm and is made of an ITO or the like, is formed on the substrate 104A by an ion plating method or the like. Further, the opposite substrate 104 is formed by forming the alignment layer 110 in the same manner as the above-mentioned alignment layer 11. FIG. 5B shows a structure at the time when this process is completed.

After that, it may be possible to form the liquid crystal device 120 by providing the liquid crystal layer 102 between the TFT array substrate 100 and the opposite substrate 104, so that the liquid crystal device 120 shown in FIG. 3 is formed. It may be possible to form the TFT array substrate 100 shown in FIGS. 1 and 2 and the liquid crystal device 120 shown in FIG. 3 by performing these processes.

Third Embodiment

Projector

Figure 6:
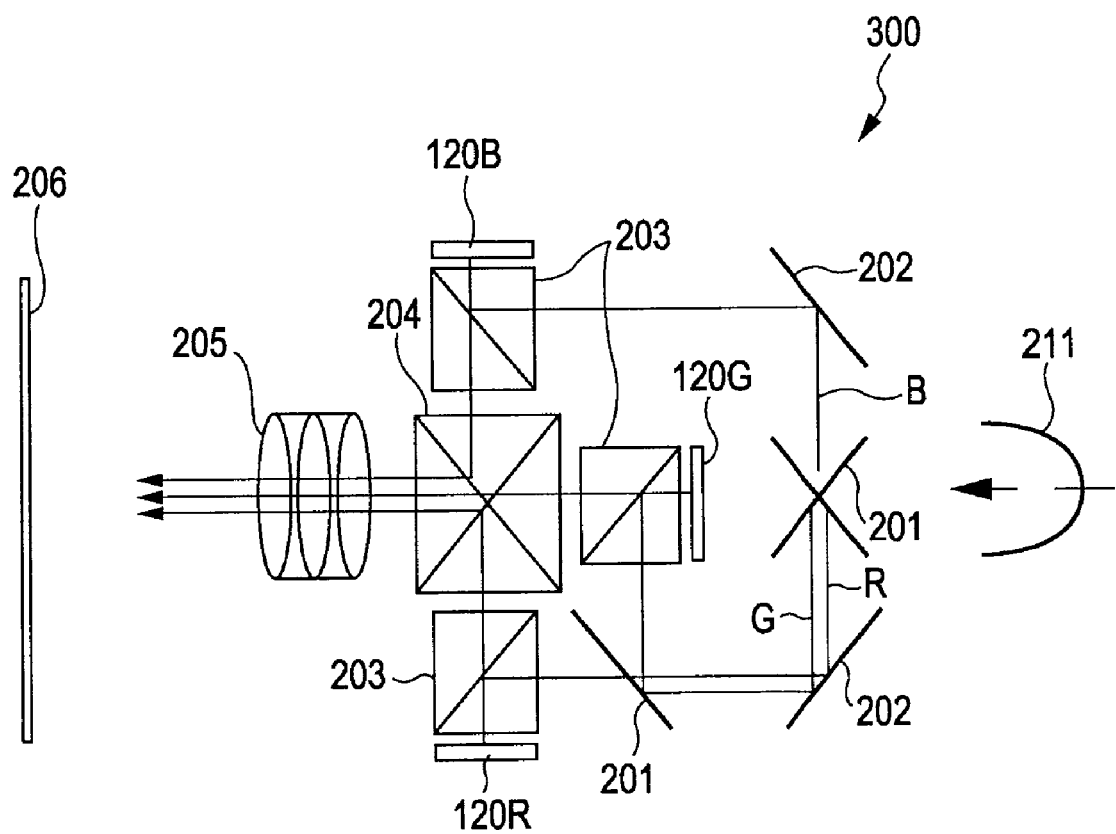
FIG. 6 is a view showing the configuration of a reflective projector.

The configuration of a projector (projection display device), which includes the liquid crystal device according to this embodiment as an optical modulator, will be described below with reference to FIG. 6. FIG. 6 is a view showing the configuration of a reflective projector.

As shown in FIG. 6, in a reflective projector 300 according to this embodiment, light (substantially white light), which is emitted from a light source lamp 211, is separated into blue light B, red light R, and green light G by a color separation mirror 201 including a cross dichroic mirror. Further, light enters polarizing beam splitters (PBSs) 203 through mirrors 202, and s-polarized light enters reflective liquid crystal devices 120B, 120R, and 120G for color light modulation by the PBSs 203. Color light, which has entered, enters the liquid crystal devices 120B, 120R, and 120G, modulates incident light, and is emitted.

Specifically, the rotation of a polarizing axis of the s-polarized light, which has entered the liquid crystal device 120, is controlled in each pixel between a P-polarizing axis and an S-polarizing axis in accordance with an effective voltage that is applied between each of the pixel electrodes 9a and 9b (see FIG. 2) and the common electrode 108 (see FIG. 3). The PBSs 203 reflect S-polarization components, which return from the reflective liquid crystal devices 120B, 120R, and 120G, and transmit P-polarization components. Accordingly, color light, which has the amount of light according to the rotation of the polarizing axis of light emitted from each of the liquid crystal devices 120B, 120R, and 120G, is transmitted from each of the PBSs 203.

This amount of light corresponds to the amount of light (transmissivity) according to the gradation level that is assigned to each color light. A wavelength selection reflecting layer which reflects blue light B and red light R is formed in a color synthesis prism 204 in an X shape. Among color lights transmitted by the PBSs 203, blue light B and red light R are reflected by the wavelength selection reflecting layer, and green light G is transmitted by the color synthesis prism 204, so that color light is combined and emitted. This color light is projected onto a screen 206 by a projection lens 205.

According to this embodiment, a liquid crystal device, which has a high aperture ratio and is bright, is mounted. Accordingly, it may be possible to obtain the projector 300 that can perform display with high brightness. Meanwhile, the projector 300 corresponding to three primary colors (RGB) of light has been described herein. However, for example, an optical system corresponding to four or five colors, which are obtained by adding a yellow color or a white color, may be used.

What is claimed is:

1. A liquid crystal device comprising:
   a first substrate;
   a second substrate that is optically transparent;
   a liquid crystal layer that is provided between the first and second substrates;
   a plurality of pixel electrodes, the plurality of pixel electrodes reflecting light and being provided between the first substrate and the liquid crystal layer;
   a translucent electrode that is provided between the second substrate and the liquid crystal layer; and
   a reflective layer that is provided close to the first substrate rather than the plurality of pixel electrodes so as to overlap, in plan view, at least a part of a gap between a first pixel electrode of the plurality of pixel electrodes and a second pixel electrode of the plurality of pixel electrodes adjacent to the first pixel electrode, the cross-section of the reflective layer in a direction along which the first and second pixel electrodes are adjacent to each other having a concave surface that is dented toward a side opposite to the liquid crystal layer.

2. The liquid crystal device according to claim 1,
   wherein an electric field that is generated by a fringe effect generated from an edge of the first pixel electrode, and an electric field that is generated by a fringe effect generated from an edge of the second pixel electrode are applied to the liquid crystal layer corresponding to the gap, and
   the gap is used for display by the electric fields.

3. The liquid crystal device according to claim 1,
   wherein when both a display state of a first pixel including the first pixel electrode and a display state of a second pixel including the second pixel electrode are a bright state, a display state of the gap is also a bright state, and
   when both the display state of the first pixel and the display state of the second pixel are a dark state, the display state of the gap is also a dark state.

4. The liquid crystal device according to claim 1,
   wherein a cross-sectional shape of the reflective layer along the direction within the gap is a parabolic shape.

5. The liquid crystal device according to claim 1,
   wherein the reflective layer overlaps at least a part of edges of the first pixel electrode in plan view.

6. The liquid crystal device according to claim 1,
   wherein light, which passes through the gap from the second substrate, is reflected by the reflective layer and is caused to converge into the gap.

7. The liquid crystal device according to claim 1,
   wherein the reflective layer is formed of the same layer as a light shielding layer that shields a part of the first substrate.

8. A projector using the liquid crystal device according to claim 1.

* * * * *